United States Patent
Inoue

(10) Patent No.: US 10,268,027 B2
(45) Date of Patent: Apr. 23, 2019

(54) IMAGING OPTICAL SYSTEM, IMAGING APPARATUS, AND PROJECTION-TYPE DISPLAY APPARATUS

(71) Applicant: FUJIFILM Corporation, Tokyo (JP)

(72) Inventor: Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 21 days.

(21) Appl. No.: 15/602,170

(22) Filed: May 23, 2017

(65) Prior Publication Data
US 2017/0343775 A1    Nov. 30, 2017

(30) Foreign Application Priority Data

May 25, 2016    (JP) .................................. 2016-104118

(51) Int. Cl.
| | |
|---|---|
| G02B 3/00 | (2006.01) |
| G02B 13/00 | (2006.01) |
| G02B 13/04 | (2006.01) |
| G02B 13/16 | (2006.01) |
| G02B 13/18 | (2006.01) |

(52) U.S. Cl.
CPC ............. G02B 13/04 (2013.01); G02B 13/16 (2013.01); G02B 13/18 (2013.01)

(58) Field of Classification Search
CPC ........ G02B 3/00; G02B 3/0037; G02B 13/00; G02B 13/0015; G02B 13/0055; G02B 13/006; G02B 13/0095; G02B 13/04; G02B 13/16; G02B 13/18; G03B 21/005; G09G 5/00
See application file for complete search history.

(56) References Cited

U.S. PATENT DOCUMENTS

| | | | | |
|---|---|---|---|---|
| 2014/0036142 | A1* | 2/2014 | Inoko ...................... | G02B 3/00 348/369 |
| 2015/0077848 | A1* | 3/2015 | Ichimura ................ | G02B 13/16 359/434 |
| 2018/0059391 | A1* | 3/2018 | Inoue ..................... | G02B 13/16 |

FOREIGN PATENT DOCUMENTS

JP    H07-119888 B2    12/1995

* cited by examiner

*Primary Examiner* — Thong Q Nguyen
(74) *Attorney, Agent, or Firm* — Studebaker & Brackett PC

(57) ABSTRACT

An imaging optical system that conjugates a reduced-side conjugate point, a magnified-side conjugate point, and a position of an internal intermediate image with each other includes, continuously in order from a most magnified side, a negative lens group and a positive lens. The negative lens group consists of three or more negative lenses. The imaging optical system includes a first cemented lens which is a lens component closest to the intermediate image, a positive second cemented lens disposed immediately after a reduced side of the first cemented lens, and one or more sets of cemented lenses disposed between the positive lens on the most magnified side and the first cemented lens.

19 Claims, 10 Drawing Sheets

EXAMPLE 1

EXAMPLE 2

EXAMPLE 3

EXAMPLE 2

IMAGING OPTICAL SYSTEM, IMAGING APPARATUS, AND PROJECTION-TYPE DISPLAY APPARATUS

CROSS-REFERENCE TO RELATED APPLICATIONS

The present application claims priority under 35 U.S.C. § 119 to Japanese Patent Application No. 2016-104118, filed on May 25, 2016. The above application is hereby expressly incorporated by reference, in its entirety, into the present application.

BACKGROUND OF THE INVENTION

1. Field of the Invention

The present invention relates to an imaging optical system suitable as a projection optical system used in a projection-type display apparatus or an image-capture optical system used in a digital camera or the like, a projection-type display apparatus including this imaging optical system, and an imaging apparatus including this imaging optical system.

2. Description of the Related Art

Hitherto, in projection-type display apparatuses, a projection optical system has been used which projects an optical image of light, modulated by a light valve such as a liquid crystal display device disposed on the reduced side or a Digital Micromirror Device (DMD: Registered Trademark), onto the magnified side. In addition, hitherto, in cameras of the above-mentioned field, an image-capture optical system has been used which captures an image of a subject on the magnified side to form the image on an imaging device on the reduced side. As an imaging optical system capable of being used in the projection optical system and the image-capture optical system, an imaging optical system is proposed which forms an intermediate image inside the imaging optical system and re-forms this intermediate image.

For example, JP1995-119888B (JP-H07-119888B) discloses an optical system that includes, in order from an object side, an objective lens, a first lens group consisting of two single lenses, a second front lens group having a negative refractive power, an erect prism, and a second back lens group having a positive refractive power, and re-forms a first image formed by the objective lens into a second image of a desired size.

With the recent improvement in the performance of a light valve, an imaging optical system which is combined with the light valve has required satisfactory aberration correction appropriate for the resolution of the light valve, and has particularly required that chromatic aberration is satisfactorily corrected. In addition, in consideration of scenes which are projected onto a large-sized screen in a large hall, an exhibition or the like using a projection-type display apparatus, or scenes for presentation or the like which are used in a relatively narrow indoor space, an imaging optical system having a wider angle is strongly demanded. Further, the imaging optical system is also required to have a small F-Number.

However, the imaging optical system disclosed in JP1995-119888B (JP-H07-119888B) cannot be said to have sufficiently small chromatic aberration, and requires an improvement in terms of the angle of view and the F-Number in order to meet the recent demand.

SUMMARY OF THE INVENTION

The present invention has been contrived in view of such circumstances, and an object thereof is to provide an imaging optical system having high optical performance by satisfactory correction of chromatic aberrations with a small F-Number and a wide angle, a projection-type display apparatus including this imaging optical system, and an imaging apparatus including this imaging optical system.

According to the present invention, there is provided an imaging optical system that conjugates both a reduced-side conjugate point and a magnified-side conjugate point with a position of an internal intermediate image, the system comprising: a negative lens group disposed on a most magnified side, and which includes three or more negative lenses; a positive lens disposed on a reduced side of this negative lens group continuously with the negative lens group; a first cemented lens which is a lens component closest to the intermediate image, and is formed by cementing one negative lens and one positive lens having a smaller Abbe number based on a d line than that of the negative lens together in order from a magnified side; a second cemented lens, disposed on a reduced side of the first cemented lens continuously with the first cemented lens, which has a positive refractive power as a whole; and at least one set of cemented lenses disposed between the positive lens on the most magnified side and the first cemented lens.

In the imaging optical system of the present invention, the second cemented lens includes one negative lens and one positive lens continuously in order from the most magnified side, and it is preferable to satisfy the following Conditional Expression (1) with respect to the negative lens and the positive lens, and more preferable to satisfy the following Conditional Expression (1-1), $$-9 < \nu dn - \nu dp < -2 \quad (1)$$

$$-8 < \nu dn - \nu dp < -3 \quad (1-1)$$

where νdn is an Abbe number based on the d line of the negative lens of the second cemented lens, and νdp is an Abbe number based on the d line of the positive lens of the second cemented lens.

In the imaging optical system of the present invention, it is preferable to satisfy the following Conditional Expression (2), and more preferable to satisfy the following Conditional Expression (2-1), $$-0.08 < |f|/Rpr < -0.03 \quad (2)$$

$$-0.07 < |f|/Rpr < -0.04 \quad (2-1)$$

where f is a focal length of the entire system, and

Rpr is a radius of curvature of a surface on the reduced side of the positive lens on the most magnified side.

In the imaging optical system of the present invention, the at least one set of cemented lenses disposed between the positive lens on the most magnified side and the first cemented lens preferably satisfies the following Conditional Expression (3), and more preferably satisfies the following Conditional Expression (3-1), $$0 < |f|/R3cr < 0.2 \quad (3)$$

$$0 < |f|/R3cr < 0.1 \quad (3-1)$$

where f is a focal length of the entire system, and

R3cr is a radius of curvature of a surface on a most reduced side of a cemented lens disposed between the positive lens on the most magnified side and the first cemented lens.

In the imaging optical system of the present invention, it is preferable to satisfy the following Conditional Expression (4), and more preferable to satisfy the following Conditional Expression (4-1), $$-0.05<|f|/R2cr<-0.01 \qquad (4)$$

$$-0.04<|f|/R2cr<-0.01 \qquad (4\text{-}1)$$

where f is a focal length of the entire system, and

R2cr is a radius of curvature of the surface of the second cemented lens on the most reduced side.

The imaging optical system of the present invention further comprises a lens on the reduced side rather than the second cemented lens, and it is preferable to satisfy the following Conditional Expression (5), and more preferable to satisfy the following Conditional Expression (5-1), $$0.9<d12/d2r<1.8 \qquad (5)$$

$$1<d12/d2r<1.7 \qquad (5\text{-}1)$$

where d12 is a distance on an optical axis between the first cemented lens and the second cemented lens, and d2r is a distance on the optical axis between the second cemented lens and a lens disposed on the reduced side of the second cemented lens continuously with the second cemented lens.

The imaging optical system of the present invention, further comprises a lens on the reduced side rather than the second cemented lens, and it is preferable to satisfy the following Conditional Expression (6), $$3<d2r/Ymax<9 \qquad (6)$$

where d2r is a distance on the optical axis between the second cemented lens and a lens disposed on the reduced side of the second cemented lens continuously with the second cemented lens, and Ymax is a maximum image height on the reduced side.

In the imaging optical system of the present invention, it is preferable that a lens surface of the first cemented lens on the most magnified side has an aspherical shape which is convex in the vicinity of the optical axis and decreases in positive refractive power toward a peripheral portion thereof.

In the imaging optical system of the present invention, it is preferable that the negative lens group includes three or more and six or less negative lenses.

In the imaging optical system of the present invention, it is preferable that a surface on the magnified side of the negative lens on the most reduced side of the negative lens group is a concave surface. In that case, it is preferable to satisfy the following Conditional Expression (7), $$0<|Rnf|/|Rnr|<0.1 \qquad (7)$$

where Rnf is a radius of curvature of the surface on the magnified side of the negative lens on the most reduced side of the negative lens group, and Rnr is a radius of curvature of a surface on the reduced side of the negative lens on the most reduced side of the negative lens group.

In the imaging optical system of the present invention, it is preferable to satisfy the following Conditional Expression (8), $$0.2<|f|/fA<0.5 \qquad (8)$$

where f is a focal length of the entire system, and fA is a combined focal length from a lens on the most magnified side to the first cemented lens.

In the imaging optical system of the present invention, it is preferable to satisfy the following Conditional Expression (9), $$-0.2<|f|/fB<0 \qquad (9)$$

where f is a focal length of the entire system, and fB is a combined focal length from the second cemented lens to a lens on the most reduced side.

According to the present invention, there is provided a projection-type display apparatus comprising: a light source; a light valve on which light from the light source is incident; and the imaging optical system of the present invention as an imaging optical system that projects an optical image of light optically modulated by the light valve onto a screen.

According to the present invention, there is provided an imaging apparatus comprising the imaging optical system of the present invention.

Meanwhile, the term "magnified side" means a projected side (screen side), and the screen side is assumed to be referred to as the magnified side, for the sake of convenience, even in a case of reduction projection. On the other hand, the term "reduced side" means an original image display region side (light valve side), and the light valve side is assumed to be referred to as the reduced side, for the sake of convenience, even in a case of reduction projection.

Meanwhile, the term "consist of" is intended to be substantial, and lenses having substantially no power, and optical elements, such as a reflecting member, a stop, a filter, and/or cover glass having substantially no power, other than a lens may be included in addition to the components exemplified herein.

Meanwhile the term "continuously" relates to a lens and an optical member having substantially power, and a reflecting member having substantially no power is assumed to be out of a target.

Meanwhile the term "closest to the intermediate image" may be assumed to be considered on the optical axis, and the term "lens component closest to the intermediate image" may mean that the intermediate image is located inside the lens component without being limited to the lens component separated from the intermediate image.

Meanwhile, the term "lens component" means that the number of air contact surfaces on the optical axis is only two of a surface on the magnified side and a surface on the reduced side, and one lens component means one single lens or a set of cemented lenses.

Meanwhile, the sign of the refractive power of the lens group, the sign of the refractive power of the lens, the surface shape of the lens, and the radius of curvature of the surface are assumed to be those in a paraxial region unless otherwise noted in a case where an aspherical surface is included.

Meanwhile, the values of the respective conditional expressions are based on the d line (wavelength of 587.6 nm).

According to the present invention, in an imaging optical system having an intermediate image formed therein, the configurations of lenses disposed on the magnified side are suitably set, three or more sets of cemented lenses are included, and the positions and/or configurations of these cemented lenses are suitably set. Therefore, it is possible to provide an imaging optical system having high optical performance by satisfactory correction of chromatic aberrations with a small F-Number and a wide angle, a projection-type display apparatus including this imaging optical system, and an imaging apparatus including this imaging optical system.

DESCRIPTION OF THE PREFERRED EMBODIMENTS

Figure 1:
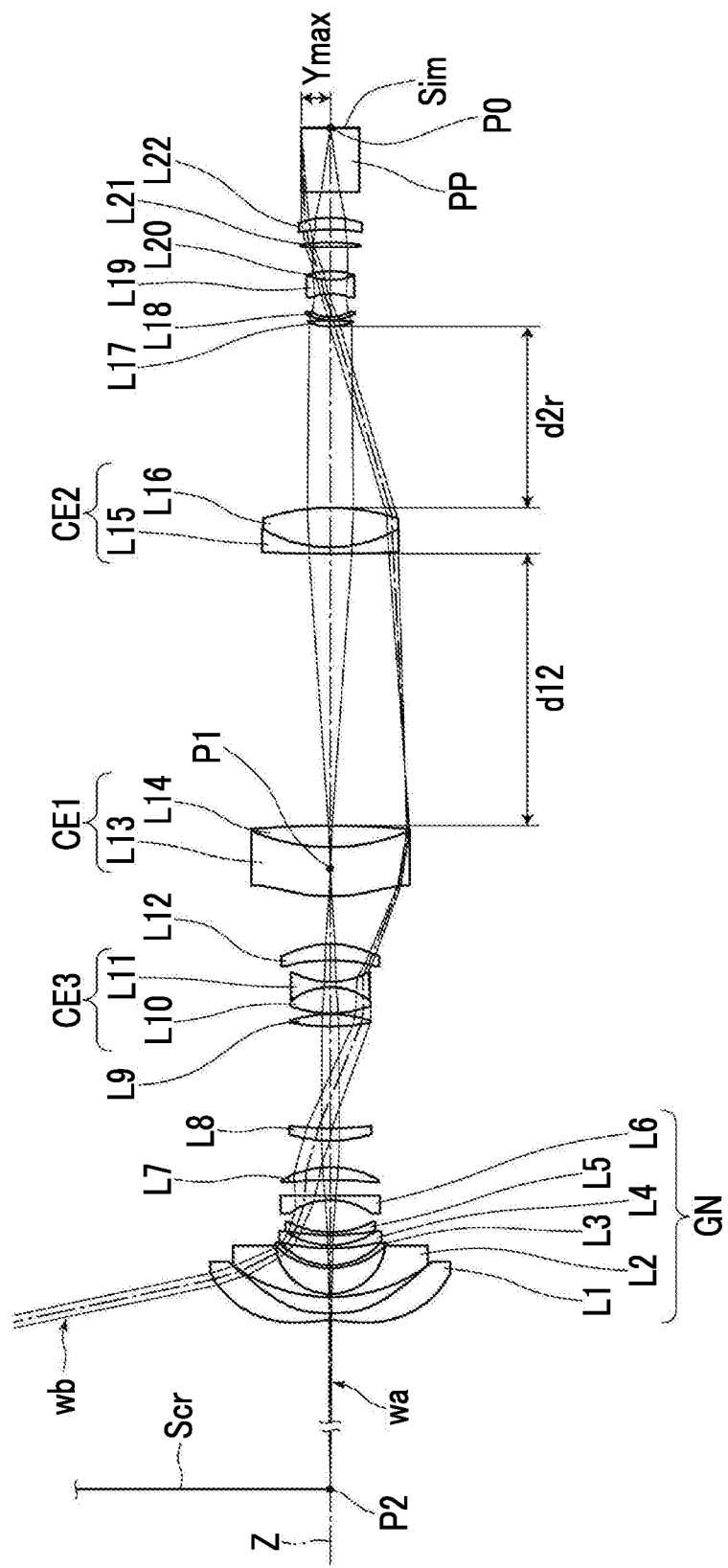
FIG. 1 is a cross-sectional view illustrating a configuration and an optical path of an imaging optical system of Example 1 of the present invention.

Hereinafter, embodiments of the present invention will be described in detail with reference to the accompanying drawings. FIG. 1 is a cross-sectional view illustrating a configuration of an imaging optical system according to an embodiment of the present invention. The configuration example shown in FIG. 1 is in common with a configuration of an imaging optical system of Example 1 described later. In FIG. 1, the left side is set to a magnified side, and the right side is set to a reduced side. The imaging optical system shown in FIG. 1 consists of twenty-two lenses of lenses L1 to L22 in order from the magnified side along an optical axis Z. In addition, in FIG. 1, an on-axis light flux wa and a light flux wb of the maximum angle of view are shown together.

This imaging optical system is mounted on, for example, a projection-type display apparatus, and can be used in projecting image information displayed on a light valve onto a screen. In FIG. 1, on the assumption of a case of being mounted on the projection-type display apparatus, a screen Scr, an optical member PP assumed to be a filter, a prism and the like which are used in a color synthesis portion or an illumination light separation portion, and an image display surface Sim of the light valve disposed on the reduced side of the optical member PP are shown together. This imaging optical system is an optical system that forms only one intermediate image. In the projection-type display apparatus, an image displayed on the image display surface Sim on an image display device is primarily formed as an intermediate image on the inside of this imaging optical system, and this intermediate image is projected onto the screen Scr and is secondarily formed as a magnified image.

This imaging optical system is an optical system that conjugates both a reduced-side conjugate point and a magnified-side conjugate point with the position of an internal intermediate image. In an optical axis direction, the position of the image display surface Sim corresponds to the position reduced-side conjugate plane, and the position of the screen Scr corresponds to the position of a magnified-side conjugate plane. FIG. 1 also shows a reduced-side conjugate point P0 which is a point of intersection between the reduced-side conjugate plane and the optical axis Z, a position P1 of the intermediate image on the optical axis, and a magnified-side conjugate point P2 which is a point of intersection between the magnified-side conjugate plane and the optical axis Z.

In an optical system having no normal intermediate image formed thereon, in a case where an attempt is made to widen an angle by reducing a focal length, lens diameters on the magnified side increase in any way. However, in an optical system of a type in which an intermediate image is formed as in the present embodiment, and this intermediate image is re-formed on a screen, it is possible to reduce a lens diameter on the magnified side. Therefore, the system is suitable for widening an angle by reducing a focal length.

This imaging optical system includes, continuously in order from the most magnified side, a negative lens group GN and a positive lens. The negative lens group GN includes three or more negative lenses. It is easy to suppress a field curvature by the negative lens group GN. In addition, it is easy to suppress distortion by the positive lens disposed on the reduced side of the negative lens group GN continuously with the negative lens group GN. In the example of FIG. 1, the lens L7 corresponds to this positive lens. The lens L7 of FIG. 1 serves as a positive lens on the most magnified side in the entire system.

In the example of FIG. 1, the negative lens group GN is constituted by the lenses L1 to L6. The negative lens group GN preferably includes three or more negative lenses in order to advantageously correct distortion and lateral chromatic aberration, and preferably includes six or less negative lenses in order to achieve a reduction in the size of the optical system. In addition, a surface on the magnified side of a negative lens on the most reduced side of the negative lens group GN is preferably a concave surface, and such a configuration is advantageous in suppressing spherical aberration.

This imaging optical system includes a first cemented lens CE1 which is a lens component closest to the intermediate image, and is formed by cementing one negative lens and one positive lens together in order from the magnified side. The negative lens and the positive lens which constitute the first cemented lens CE1 are configured so that an Abbe number based on the d line of the positive lens is smaller than an Abbe number based on a d line of the negative lens. The cemented lens having the above configuration is disposed as the lens component closest to the intermediate image, and thus it is easy to satisfactorily correct the lateral chromatic aberration and on-axis chromatic aberration. Since the height of an off-axis ray of light is large in the lens component closest to the intermediate image, this lens component is formed as a cemented lens consisting of positive and negative lenses, and the Abbe numbers of these positive and negative lenses are set as described above, thereby allowing the lateral chromatic aberration to be effectively corrected, which leads to be the advantage of a wide angle. Meanwhile, in the example of FIG. 1, the negative lens L13 and the positive lens L14 constitute the cemented lens CE1, and the position P1 of the intermediate image is located within the first cemented lens CE1.

In addition, this imaging optical system includes a second cemented lens CE2, disposed continuously with the first cemented lens CE1 on the reduced side of the first cemented lens CE1, which has a positive refractive power as a whole. Since the second cemented lens CE2 is disposed continuously with the first cemented lens CE1, the height of the off-axis ray of light in the second cemented lens CE2 is set to be relatively high. In addition, since the second cemented lens CE2 is a lens component, disposed on the reduced side of the intermediate image, which has a positive refractive power, the on-axis light flux spreads in the second cemented lens CE2. It is easy to satisfactorily correct the lateral chromatic aberration and the on-axis chromatic aberration by the second cemented lens CE2.

Further, this imaging optical system includes at least one set of cemented lenses disposed between the positive lens on the most magnified side and the first cemented lens CE1. Thereby, it is easy to satisfactorily correct the on-axis chromatic aberration and the lateral chromatic aberration. In the example of FIG. 1, a third cemented lens CE3 having the lens L10 and the lens L11 cemented together is disposed between the positive lens L7 on the most magnified side and the first cemented lens CE1. In this manner, the reduced side of the first cemented lens CE1 is provided with the second cemented lens CE2, and the magnified side is provided with the third cemented lens CE3, whereby it is easy to correct chromatic aberrations while satisfactorily taking a balance between the on-axis chromatic aberration and the lateral chromatic aberration.

Generally, as an F-Number is made smaller and the angle of view is made larger, it is difficult to correct the chromatic aberrations. However, since the imaging optical system of the present embodiment includes at least three sets of cemented lenses, has each cemented lens suitably disposed therein, and has even a lens configuration suitably set in the first cemented lens CE1, it is easy to satisfactorily correct the on-axis chromatic aberration and the lateral chromatic aberration, which leads to the advantage of realizing a lens system having a small F-Number and a wide angle.

Next, preferred configurations and the effects thereof relating to conditional expressions of the imaging optical system of the present embodiment will be described. It is preferable that the imaging optical system satisfies any one of respective conditional expressions described below or any combination thereof.

It is preferable that the second cemented lens CE2 includes one negative lens and one positive lens continuously in order from the most magnified side, and in that case, it is preferable that the following Conditional Expression (1) is satisfied with respect to the negative lens and the positive lens. Meanwhile, the term "most magnified side" as used herein means a most magnified side within the second cemented lens CE2.

$$-9 < vdn - vdp < -2 \quad (1)$$

Here, vdn is an Abbe number based on the d line of the negative lens of the second cemented lens, and vdp is an Abbe number based on the d line of the positive lens of the second cemented lens.

It is configured to satisfy Conditional Expression (1), and thus it is possible to satisfactorily correct the on-axis chromatic aberration and the lateral chromatic aberration. It is more preferable to satisfy the following Conditional Expression (1-1) in order to enhance the effect of Conditional Expression (1).

$$-8 < vdn - vdp < -3 \quad (1\text{-}1)$$

It is preferable that the following Conditional Expression (2) is satisfied with respect to the positive lens on the most magnified side.

$$-0.08 < |f|/Rpr < -0.03 \quad (2)$$

Here, f is a focal length of the entire system, and

Rpr is a radius of curvature of a surface on the reduced side of the positive lens on the most magnified side.

It is configured to satisfy Conditional Expression (2), and thus it is possible to suppress the distortion. It is more preferable to satisfy the following Conditional Expression (2-1) in order to enhance the effect of Conditional Expression (2).

$$-0.07 < |f|/Rpr < -0.04 \quad (2\text{-}1)$$

In addition, it is preferable that at least one set of cemented lenses disposed between the positive lens on the most magnified side and the first cemented lens CE1 satisfies the following Conditional Expression (3).

$$0 < |f|/R3cr < 0.2 \quad (3)$$

Here, f is a focal length of the entire system, and

R3cr is a radius of curvature of a surface on the most reduced side of a cemented lens disposed between the positive lens on the most magnified side and the first cemented lens.

It is configured to satisfy Conditional Expression (3), and thus it is possible to suppress astigmatism. It is more preferable to satisfy the following Conditional Expression (3-1) in order to enhance the effect of the upper limit of Conditional Expression (3) while obtaining the effect of the lower limit of Conditional Expression (3).

$$0 < |f|/R3cr < 0.1 \quad (3\text{-}1)$$

It is preferable that the second cemented lens CE2 satisfies the following Conditional Expression (4).

$$-0.05 < |f|/R2cr < -0.01 \quad (4)$$

Here, f is a focal length of the entire system, and

R2cr is a radius of curvature of a surface on the most reduced side of the second cemented lens.

The ratio value is not set to be equal to or less than the lower limit of Conditional Expression (4), and thus it is possible to suppress the field curvature. The ratio value is not set to be equal to or greater than the upper limit of Conditional Expression (4), which leads to the advantage of a reduction in the entire length. It is more preferable to satisfy the following Conditional Expression (4-1) in order to enhance the effect of the lower limit of Conditional Expression (4) while obtaining the effect of the upper limit of Conditional Expression (4).

$$-0.04 < |f|/R2cr < -0.01 \quad (4\text{-}1)$$

In addition, it is preferable that this imaging optical system includes a lens on the reduced side rather than the second cemented lens CE2, and in that case, it is preferable to satisfy the following Conditional Expression (5).

$$0.9 < d12/d2r < 1.8 \quad (5)$$

Here, d12 is a distance on an optical axis between the first cemented lens and the second cemented lens, and d2r is a distance on the optical axis between the second cemented lens and a lens disposed on the reduced side of the second cemented lens continuously with the second cemented lens.

It is configured to satisfy Conditional Expression (5), and thus it is possible to suppress distortion. In order to enhance the effect of Conditional Expression (5), it is more preferable to satisfy the following Conditional Expression (5-1).

$$1<d12/d2r<1.7 \qquad (5\text{-}1)$$

In a case where this imaging optical system includes a lens on the reduced side rather than the second cemented lens CE2, it is preferable to satisfy the following Conditional Expression (6).

$$3<d2r/Y\text{max}<9 \qquad (6)$$

Here, d2r is a distance on the optical axis between the second cemented lens and a lens disposed on the reduced side of the second cemented lens continuously with the second cemented lens, and Ymax is a maximum image height on the reduced side.

It is configured to satisfy Conditional Expression (6), and thus it is possible to suppress the distortion. It is more preferable to satisfy the following Conditional Expression (6-1) in order to enhance the effect of Conditional Expression (6).

$$4<d2r/Y\text{max}<8 \qquad (6\text{-}1)$$

In a case where the surface on the magnified side of the negative lens on the most reduced side of the negative lens group GN is formed as a concave surface, it is preferable to satisfy the following Conditional Expression (7).

$$0<|Rnf|/|Rnr|<0.1 \qquad (7)$$

Here, Rnf is a radius of curvature of the surface on the magnified side of the negative lens on the most reduced side of the negative lens group, and Rnr is a radius of curvature of a surface on the reduced side of the negative lens on the most reduced side of the negative lens group.

It is configured to satisfy Conditional Expression (7), and thus it is possible to suppress the spherical aberration. It is more preferable to satisfy the following Conditional Expression (7-1) in order to enhance the effect of Conditional Expression (7).

$$0.005<|Rnf|/|Rnr|<0.095 \qquad (7\text{-}1)$$

In addition, it is preferable that this imaging optical system satisfies the following Conditional Expression (8).

$$0.2<|f|/fA<0.5 \qquad (8)$$

Here, f is a focal length of the entire system, and fA is a combined focal length from a lens on the most magnified side to the first cemented lens.

The ratio value is not set to be equal to or less than the lower limit of Conditional Expression (8), which leads to the advantage of a reduction in the entire length. The ratio value is not set to be equal to or greater than the upper limit of Conditional Expression (8), and thus it is possible to suppress the field curvature. It is more preferable to satisfy the following Conditional Expression (8-1) in order to enhance the effect of Conditional Expression (8).

$$0.27<|f|/fA<0.43 \qquad (8\text{-}1)$$

In addition, it is preferable that this imaging optical system satisfies the following Conditional Expression (9).

$$-0.2<|f|/fB<0 \qquad (9)$$

Here, f is a focal length of the entire system, and fB is a combined focal length from the second cemented lens to a lens on the most reduced side.

The ratio value is not set to be equal to or less than the lower limit of Conditional Expression (9), it is possible to suppress the field curvature. The ratio value is not set to be equal to or greater than the upper limit of Conditional Expression (9), which leads to the advantage of a reduction in the entire length. It is more preferable to satisfy the following Conditional Expression (9-1) in order to enhance the effect of the lower limit of Conditional Expression (9) while obtaining the effect of the upper limit of Conditional Expression (9).

$$-0.1<|f|/fB<0 \qquad (9\text{-}1)$$

Meanwhile, the imaging optical system of FIG. 1 consists of twenty-two lenses, but it is also possible to adopt a configuration in which the number of lenses constituting the imaging optical system is different from that in the example of FIG. 1.

The above-mentioned preferable configurations and available configurations can be arbitrarily combined, and it is preferable that the configurations are appropriately selectively adopted in accordance with requested specification. According to the present embodiment, it is possible to realize an imaging optical system having high optical performance by satisfactory correction of chromatic aberrations with a small F-Number and a wide angle. Meanwhile, the term "small F-Number" as used herein means that the F-Number is smaller than 2.4, and the term "wide angle" means that the total angle of view is larger than 120°.

Figure 2:
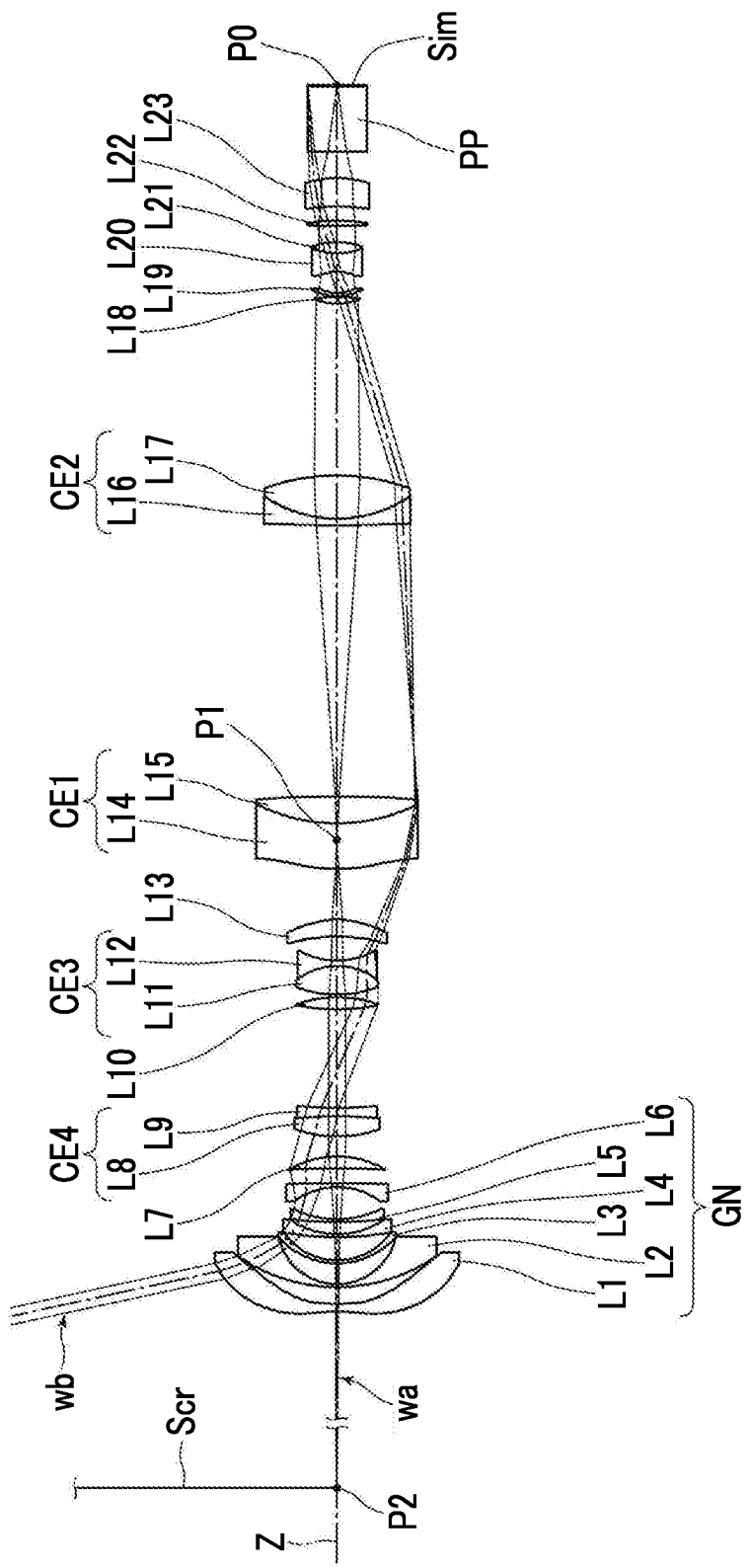
FIG. 2 is a cross-sectional view illustrating a configuration and an optical path of an imaging optical system of Example 2 of the present invention.
Figure 3:
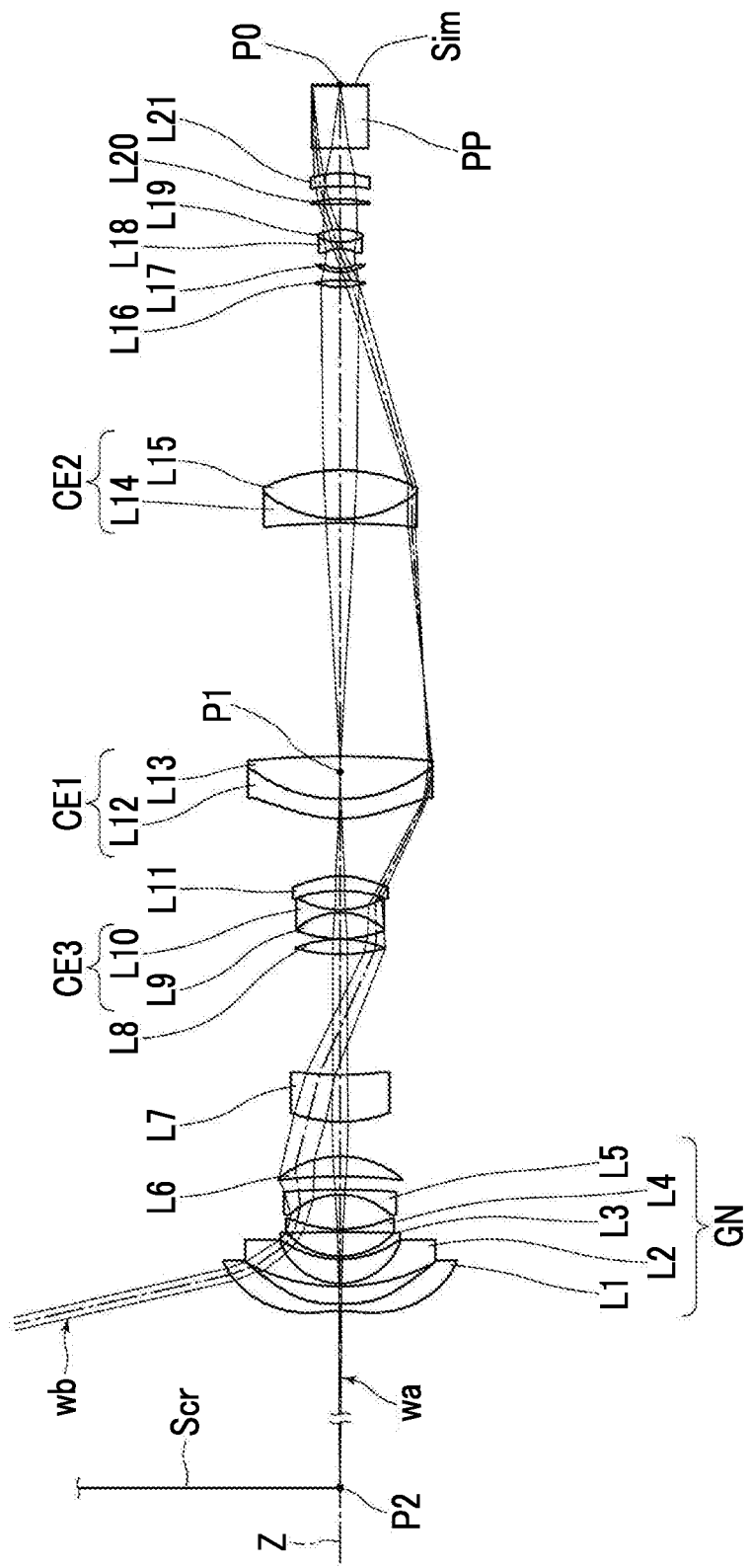
FIG. 3 is a cross-sectional view illustrating a configuration and an optical path of an imaging optical system of Example 3 of the present invention.

Next, numerical value examples of the imaging optical system of the present invention will be described. Meanwhile, reference signs L1 to L23 which are used in FIGS. 1 to 3 are used independently of each other for each drawing in order to avoid complicated description due to an increase in the number of digits of a reference sign, and thus even in a case where reference signs in common with those of other drawings are given, these reference signs are not necessarily common configurations.

Example 1

A lens configuration and an optical path of an imaging optical system of Example 1 are shown in FIG. 1, and a method of illustration thereof is as described. Therefore, the repeated description thereof will be omitted herein. The imaging optical system of Example 1 consists of, in order from the magnified side, negative lenses L1 to L6, positive lenses L7 to L10, a negative lens L11, a positive lens L12, a negative lens L13, a positive lens L14, a negative lens L15, positive lenses L16 and L17, negative lenses L18 and L19, and positive lenses L20 to L22. The lens L10 and the lens L11 are cemented together and constitute a third cemented lens CE3. The lens L13 and the lens L14 are cemented together and constitute a first cemented lens CE1. The lens L15 and the lens L16 are cemented together and constitute a second cemented lens CE2. The lens L19 and the lens L20 are cemented together.

Table 1 shows basic lens data of the imaging optical system of Example 1, Table 2 shows specifications, and Table 3 shows aspherical coefficients. The column of Si in Table 1 indicates an i-th (i=1, 2, 3, . . . ) surface number in a case where surface numbers are assigned to the surfaces of components so as to sequentially increase toward the reduced side with a surface on the magnified side of a component on the most magnified side set to a first surface, the column of Ri indicates a radius of curvature of the i-th surface, and the column of Di indicates a surface spacing on the optical axis between the i-th surface and an (i+1)-th surface. The column of Ndj in Table 1 indicates a refractive index of a j-th (j=1, 2, 3, . . . ) component relating to the d line (wavelength of 587.6 nm), where j sequentially increases toward the reduced side with the component on the most magnified side set to a first component, and the column of νdj indicates an Abbe number based on the d line of the j-th component.

Here, the sign of the radius of curvature is set to be positive with respect to a surface shape with a convex surface toward the magnified side, and is set to be negative with respect to a surface shape with the convex surface toward the reduced side. In Table 1, the optical member PP is shown together.

Table 2 shows values of the absolute value |f| of the focal length of the entire system, a back focus Bf at air conversion length in a case where the reduced side is set to a back side, the F-Number FNo., and the maximum total angle of view 2ω, on the basis of the d line. (°) in the place of 2ω means that the unit thereof is a degree.

In Table 1, mark * is attached to the surface number of an aspherical surface, and the numerical values of a paraxial radius of curvature are written in the column of the radius of curvature of the aspherical surface. Table 3 shows an aspherical coefficient of each aspherical surface of Example 1. "E-n" (n is an integer) of the numerical value of the aspherical coefficient of Table 3 means "×10$^{-n}$". The aspherical coefficient is a value of each of coefficients KA and Am (m=3, 4, 5, . . . 20) in an aspherical expression represented by the following expression.

$$Zd = \frac{C \times h^2}{1 + \sqrt{1 - KA \times C^2 \times h^2}} + \sum_m Am \times h^m \quad \text{[Expression 1]}$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis to a lens surface), C is a paraxial curvature, and KA and Am are aspherical coefficients.

In data of each table, a degree is used as a unit of an angle, and mm is used as a unit of a length, but it is also possible to use other appropriate units since the optical system can be used even in a case where the system is magnified or reduced in proportion. In addition, the following each table describes numerical values rounded off to predetermined decimal places.

TABLE 1

Example 1

| Si | Ri | Di | Ndj | ν dj |
|---|---|---|---|---|
| *1 | −34.3443 | 3.5991 | 1.53158 | 55.08 |
| *2 | 46127.4802 | 8.3008 | | |
| 3 | 82.1746 | 1.5005 | 1.72916 | 54.68 |
| 4 | 27.7191 | 13.1830 | | |
| 5 | 38.5851 | 1.4991 | 2.00178 | 19.32 |
| 6 | 33.4913 | 8.7152 | | |
| 7 | 106.8343 | 1.5001 | 1.94595 | 17.98 |
| 8 | 39.3345 | 5.2297 | | |
| 9 | 136.0958 | 1.3990 | 1.72916 | 54.68 |
| 10 | 44.7072 | 16.4313 | | |
| *11 | −35.2169 | 2.3745 | 1.53775 | 74.70 |
| 12 | −6014.4444 | 7.7409 | | |
| 13 | −277.9526 | 6.6256 | 1.91082 | 35.25 |
| 14 | −47.6514 | 13.5086 | | |
| 15 | 65.2623 | 6.3195 | 2.00100 | 29.13 |
| 16 | 185.7249 | 51.9928 | | |

TABLE 1-continued

Example 1

| Si | Ri | Di | Ndj | ν dj |
|---|---|---|---|---|
| 17 | 99.2876 | 6.2555 | 1.59522 | 67.73 |
| 18 | −61.8718 | 0.5178 | | |
| 19 | 57.0809 | 13.3054 | 1.75500 | 52.32 |
| 20 | −31.1126 | 2.7000 | 1.92286 | 20.88 |
| 21 | 39.4356 | 11.0176 | | |
| *22 | −69.2414 | 8.4176 | 1.83481 | 42.72 |
| *23 | −31.7058 | 24.2336 | | |
| *24 | 179.1681 | 25.0195 | 1.53775 | 74.70 |
| 25 | 97.3983 | 11.0005 | 2.00178 | 19.32 |
| 26 | −461.9373 | 138.8549 | | |
| 27 | 882.3511 | 3.1993 | 2.00178 | 19.32 |
| 28 | 65.9850 | 20.1523 | 1.85478 | 24.80 |
| 29 | −106.4267 | 92.4994 | | |
| 30 | 30.2294 | 3.1003 | 1.49700 | 81.54 |
| 31 | −109.7667 | 0.2008 | | |
| 32 | 25.1714 | 1.4991 | 1.53775 | 74.70 |
| 33 | 18.0121 | 11.9637 | | |
| 35 | −23.0584 | 7.0278 | 1.85478 | 24.80 |
| 36 | 31.0768 | 4.5113 | 1.74100 | 52.64 |
| 31 | −33.9632 | 12.2094 | | |
| 38 | 744.9768 | 2.4990 | 1.94595 | 17.98 |
| 39 | −82.6140 | 6.5425 | | |
| 40 | −90.5831 | 6.0004 | 2.00178 | 19.32 |
| 41 | −46.7006 | 13.1000 | | |
| 42 | ∞ | 32.3000 | 1.51633 | 64.14 |
| 43 | ∞ | | | |

TABLE 2

Example 1

| |f| | 3.08 |
|---|---|
| Bf | 34.92 |
| FNo. | 2.39 |
| 2 ω (°) | 155.8 |

TABLE 3

Example 1

| SURFACE NUMBER | 1 | 2 | 11 |
|---|---|---|---|
| KA | −1.3591752E+00 | −1.5877601E+02 | 1.3797987E+00 |
| A3 | 5.6603425E−04 | 8.6892834E−04 | −3.1014819E−05 |
| A4 | 1.4975709E−05 | −1.3828619E−04 | 1.3801705E−06 |
| A5 | −1.3856927E−06 | 2.8704384E−05 | 2.5767530E−09 |
| A6 | 1.8159594E−08 | −3.9237127E−06 | −7.5285264E−10 |
| A7 | 7.2958194E−10 | 3.6668453E−07 | 7.2410286E−12 |
| A8 | −1.8866025E−11 | −2.4468110E−08 | 2.2885940E−13 |
| A9 | −2.3759668E−13 | 1.1877691E−09 | −3.0727043E−15 |
| A10 | 1.0021352E−14 | −4.2243804E−11 | −4.1450072E−17 |
| A11 | 4.1320237E−17 | 1.1000307E−12 | 5.6042404E−19 |
| A12 | −3.1959863E−18 | −2.0773190E−14 | 4.5641979E−21 |
| A13 | −7.6261560E−21 | 2.7772279E−16 | −5.5254441E−23 |
| A14 | 7.4596275E−22 | −2.4916923E−18 | −3.0436375E−25 |
| A15 | 1.9709806E−24 | 1.3191404E−20 | 3.0661267E−27 |
| A16 | −1.3411695E−25 | −2.7294471E−23 | 1.1870554E−29 |
| A17 | −2.3209150E−28 | 7.1718012E−27 | −9.0240402E−32 |
| A18 | 1.4834036E−29 | −7.8462265E−28 | −2.4545682E−34 |
| A19 | 2.7974048E−33 | −4.2551979E−31 | 1.0976001E−36 |
| A20 | −6.4095388E−34 | 5.4641661E−32 | 2.0280825E−39 |

| SURFACE NUMBER | 22 | 23 | 24 |
|---|---|---|---|
| KA | −2.7596123E−01 | 6.4859424E−01 | −1.8796674E+00 |
| A3 | −1.3366986E−04 | −1.5884896E−04 | 2.5928953E−04 |
| A4 | 6.5601698E−05 | 7.1608118E−05 | 5.2665269E−06 |
| A5 | −5.0548503E−06 | −3.5638044E−06 | −4.5796081E−07 |
| A6 | −2.1466984E−07 | −2.2249770E−07 | −1.8810467E−08 |

TABLE 3-continued

| | Example 1 | | |
|---|---|---|---|
| A7 | 6.2620165E−08 | 3.7318347E−08 | 5.0696963E−10 |
| A8 | −1.7993811E−09 | 6.6531192E−11 | 3.0532762E−11 |
| A9 | −3.3090450E−10 | −2.1922562E−10 | −4.6710466E−13 |
| A10 | 2.0957271E−11 | 5.1711944E−12 | −2.7065836E−14 |
| A11 | 7.5342315E−13 | 7.1159904E−13 | 3.0529349E−16 |
| A12 | −8.8615783E−14 | −2.8647683E−14 | 1.4891425E−17 |
| A13 | −7.7543057E−18 | −1.2065288E−15 | −1.2590616E−19 |
| A14 | 1.8537081E−16 | 6.9429403E−17 | −5.3498782E−21 |
| A15 | −3.2765477E−18 | 8.9656942E−19 | 3.0522550E−23 |
| A16 | −1.8149361E−19 | −8.4206778E−20 | 1.2265113E−24 |
| A17 | 5.7856799E−21 | −2.0537544E−23 | −3.9415166E−27 |
| A18 | 4.4838089E−23 | 4.7348794E−23 | −1.6159773E−28 |
| A19 | −3.2288826E−24 | −2.1717490E−25 | 2.0830248E−31 |
| A20 | 2.8460304E−26 | −8.4338153E−27 | 9.2091074E−33 |

Figure 4:
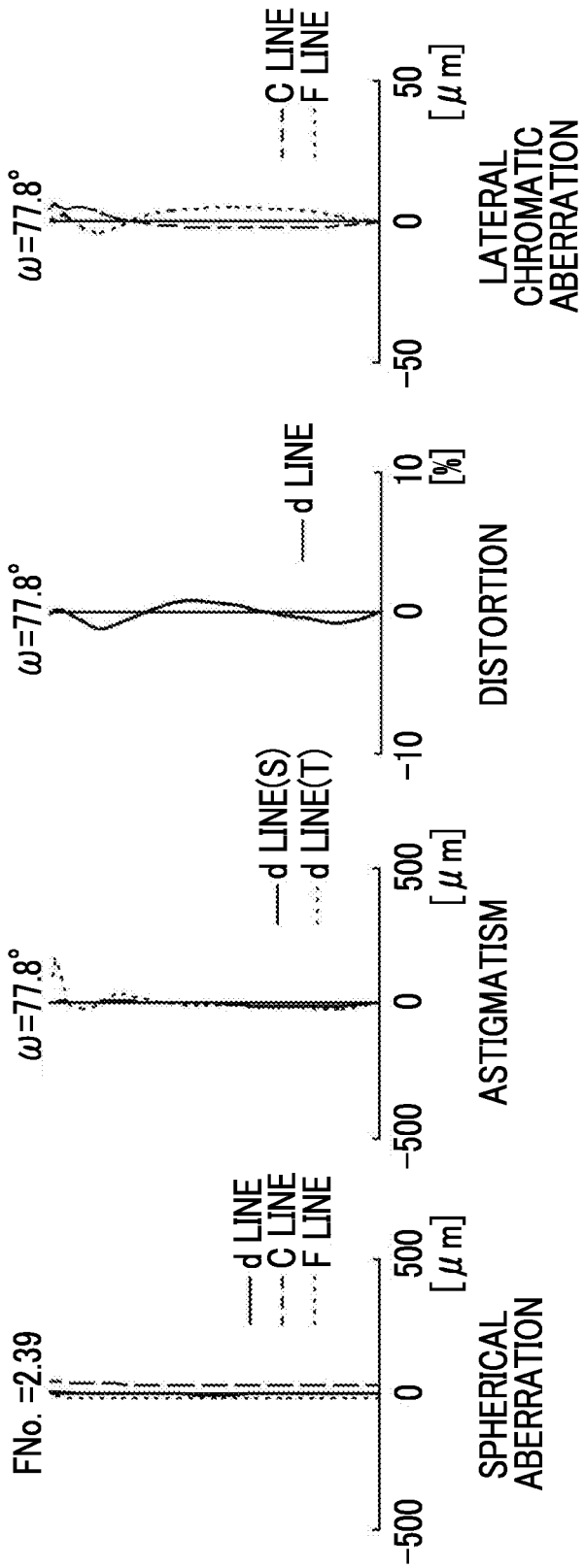
FIG. 4 is a diagram of aberrations of the imaging optical system of Example 1 of the present invention.

FIG. 4 shows a diagram of aberrations of spherical aberration, astigmatism, distortion, and lateral chromatic aberration (chromatic aberration of magnification) of the imaging optical system of Example 1, in order from the left side. In the spherical aberration diagram, aberrations relating to a d line (wavelength of 587.6 nm), a C line (wavelength of 656.3 nm), and an F line (wavelength of 486.1 nm) are indicated by a solid line, a long dashed line, and a short dashed line, respectively. In the astigmatism diagram, aberration relating to the d line in a sagittal direction is indicated by a solid line, and aberration relating to the d line in a tangential direction is indicated by a short dashed line. In the distortion diagram, aberration relating to the d line is indicated by a solid line. In the lateral chromatic aberration diagram, aberrations relating to the C line and the F line are indicated by a long dashed line and a short dashed line, respectively. FNo. in the spherical aberration diagram means an F-Number, and w in the other aberration diagrams mean a half angle of view. The diagram shown in FIG. 4 corresponds to a case where a distance on the optical axis from a lens surface on the most magnified side to a magnified-side conjugate point is 0.4295 m.

In the description of Example 1, symbols, meanings, and description methods of the respective pieces of data are the same as those in the following examples unless otherwise noted, and thus the repeated description thereof will be omitted below.

Example 2

FIG. 2 shows a cross-sectional view of a lens configuration and an optical path of an imaging optical system of Example 2. The imaging optical system of Example 2 consists of, in order from a magnified side, negative lenses L1 to L6, positive lenses L7 to L8, a negative lens L9, positive lenses L10 and L11, a negative lens L12, a positive lens L13, a negative lens L14, a positive lens L15, a negative lens L16, positive lenses L17 and L18, negative lenses L19 and L20, and positive lenses L21 to L23. The lens L8 and the lens L9 are cemented together and constitute a fourth cemented lens CE4. The lens L11 and the lens L12 are cemented together and constitute a third cemented lens CE3. The lens L14 and the lens L15 are cemented together and constitute a first cemented lens CE1. The lens L16 and the lens L17 are cemented together and constitute a second cemented lens CE2. The lens L20 and the lens L21 are cemented together.

Figure 5:
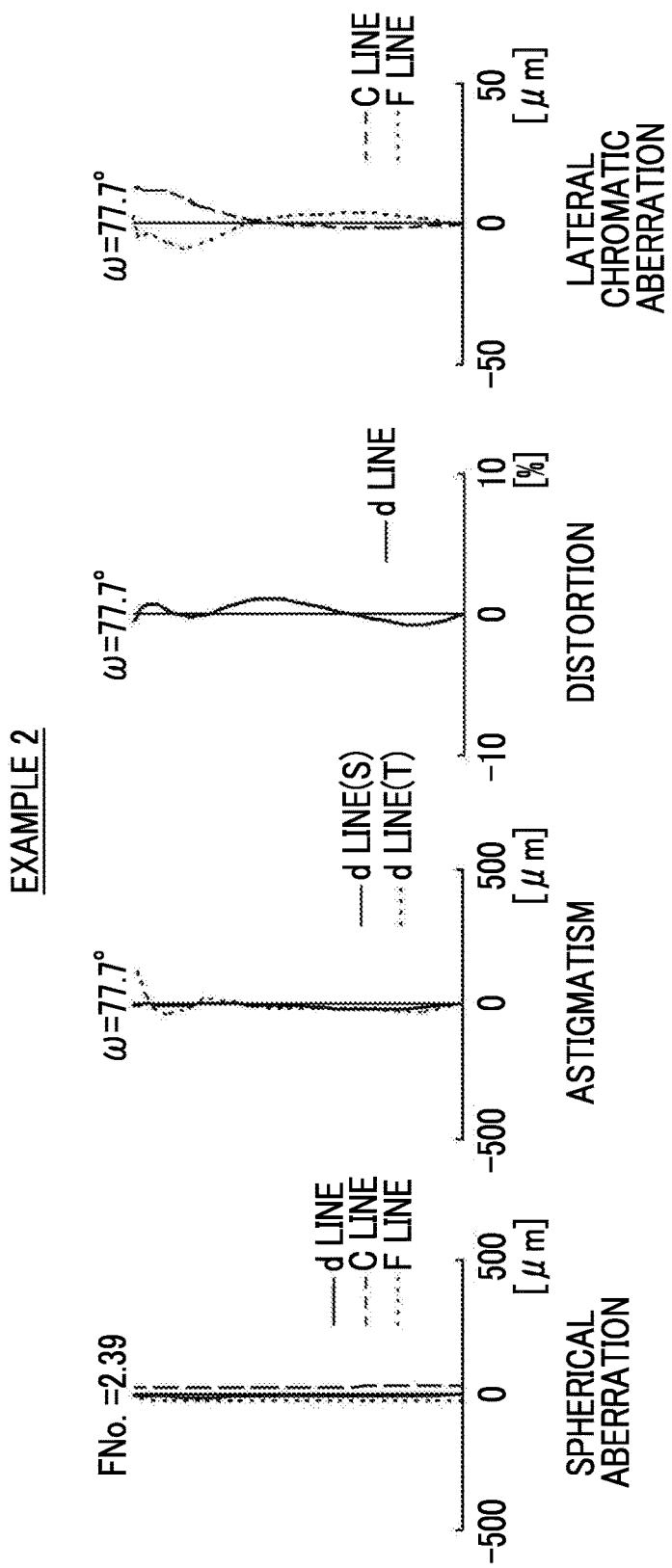
FIG. 5 is a diagram of aberrations of the imaging optical system of Example 2 of the present invention.

Table 4 shows basic lens data of the imaging optical system of Example 2, Table 5 shows specifications, Table 6 shows aspherical coefficients, and FIG. 5 shows a diagram of aberrations. The diagram shown in FIG. 5 corresponds to a case where a distance on the optical axis from a lens surface on the most magnified side to a magnified-side conjugate point is 0.4295 m.

TABLE 4

| | Example 2 | | | |
|---|---|---|---|---|
| Si | Ri | Di | Ndj | ν dj |
| *1 | −33.6000 | 3.5990 | 1.53158 | 55.08 |
| *2 | −1345.8873 | 8.2990 | | |
| 3 | 85.8974 | 1.4991 | 1.77250 | 49.60 |
| 4 | 29.5414 | 10.2511 | | |
| 5 | 38.2670 | 1.4991 | 2.00178 | 19.32 |
| 6 | 32.2629 | 11.4138 | | |
| 7 | 151.4240 | 1.5007 | 1.95906 | 17.47 |
| 8 | 40.1025 | 5.9990 | | |
| 9 | 182.2222 | 1.3992 | 1.61800 | 63.33 |
| 10 | 47.8657 | 15.8968 | | |
| *11 | −36.6563 | 1.8254 | 1.48749 | 70.24 |
| 12 | −655.5534 | 7.5015 | | |
| 13 | −315.5639 | 5.6850 | 1.92119 | 23.96 |
| 14 | −47.7334 | 9.9991 | | |
| 15 | 62.3934 | 10.0202 | 1.76200 | 40.10 |
| 16 | −227.3490 | 4.1988 | 1.83481 | 42.72 |
| 17 | 212.0398 | 48.6271 | | |
| 18 | 93.4591 | 5.9991 | 1.59522 | 67.73 |
| 19 | −60.2895 | 1.3539 | | |
| 20 | 54.4379 | 14.1366 | 1.75500 | 52.32 |
| 21 | −31.8382 | 2.6995 | 1.92286 | 20.88 |
| 22 | 37.5307 | 11.7846 | | |
| *23 | −68.4799 | 8.5522 | 1.83481 | 42.72 |
| *24 | −31.0918 | 25.0341 | | |
| *25 | 257.4196 | 22.4608 | 1.53775 | 74.70 |
| 26 | 86.8813 | 13.3070 | 2.00178 | 19.32 |
| 27 | −536.1862 | 134.2059 | | |
| 28 | 970.0241 | 3.1982 | 2.00178 | 19.32 |
| 29 | 63.2172 | 21.3584 | 1.85478 | 24.80 |
| 30 | −103.2309 | 85.0367 | | |
| 31 | 30.6601 | 3.1665 | 1.49700 | 81.54 |
| 32 | −94.2073 | 0.4497 | | |
| 33 | 25.2366 | 1.5254 | 1.53775 | 74.70 |
| 34 | 17.7710 | 10.5560 | | |
| 36 | −22.6271 | 9.1734 | 1.85478 | 24.80 |
| 37 | 32.3752 | 5.5102 | 1.74100 | 52.64 |
| 38 | −33.7750 | 8.0432 | | |
| 39 | 317.9268 | 2.4996 | 1.94595 | 17.98 |
| 40 | −95.2879 | 7.0877 | | |
| 41 | −92.3017 | 14.0231 | 2.00178 | 19.32 |
| 42 | −48.4172 | 13.1000 | | |
| 43 | ∞ | 32.3000 | 1.51633 | 64.14 |
| 44 | ∞ | | | |

TABLE 5

| Example 2 | |
|---|---|
| \|f\| | 3.12 |
| Bf | 34.92 |
| FNo. | 2.39 |
| 2 ω (°) | 155.4 |

TABLE 6

| | Example 2 | | |
|---|---|---|---|
| SURFACE NUMBER | 1 | 2 | 11 |
| KA | −1.3591752E+00 | −1.5877601E+02 | 1.5367966E+00 |
| A3 | 5.6603425E−04 | 8.6892834E−04 | −1.7641035E−05 |
| A4 | 1.4975709E−05 | −1.3828619E−04 | 5.7162558E−07 |
| A5 | −1.3856927E−06 | 2.8704384E−05 | 5.3922381E−09 |
| A6 | 1.8159594E−08 | −3.9237127E−06 | 1.0872571E−10 |
| A7 | 7.2958194E−10 | 3.6668453E−07 | 4.6474980E−12 |

TABLE 6-continued

Example 2

| | | | |
|---|---|---|---|
| A8 | −1.8866025E−11 | −2.4468110E−08 | −1.8805496E−13 |
| A9 | −2.3759668E−13 | 1.1877691E−09 | −2.7220191E−15 |
| A10 | 1.0021352E−14 | −4.2243804E−11 | 6.3212296E−17 |
| A11 | 4.1320237E−17 | 1.1000307E−12 | 5.9274506E−19 |
| A12 | −3.1959863E−18 | −2.0773190E−14 | −1.0775983E−20 |
| A13 | −7.6261560E−21 | 2.7772279E−16 | −6.7275117E−23 |
| A14 | 7.4596275E−22 | −2.4916923E−18 | 1.0642825E−24 |
| A15 | 1.9709806E−24 | 1.3191404E−20 | 4.2274599E−27 |
| A16 | −1.3411695E−25 | −2.7294471E−23 | −6.1399461E−29 |
| A17 | −2.3209150E−28 | 7.1718012E−27 | −1.3956060E−31 |
| A18 | 1.4834036E−29 | −7.8462265E−28 | 1.9181484E−33 |
| A19 | 2.7974048E−33 | −4.2551979E−31 | 1.8920395E−36 |
| A20 | −6.4095388E−34 | 5.4641661E−32 | −2.5055403E−38 |

| SURFACE NUMBER | 23 | 24 | 25 |
|---|---|---|---|
| KA | −2.7596123E−01 | 6.4859424E−01 | −5.5588400E−01 |
| A3 | −1.3366986E−04 | −1.5884896E−04 | 2.6483925E−04 |
| A4 | 6.5601698E−05 | 7.1608118E−05 | 8.9027328E−06 |
| A5 | −5.0548503E−06 | −3.5638044E−06 | −5.0017908E−07 |
| A6 | −2.1466984E−07 | −2.2249770E−07 | −2.9527714E−08 |
| A7 | 6.2620165E−08 | 3.7318347E−08 | 6.7148171E−10 |
| A8 | −1.7993811E−09 | 6.6531192E−11 | 4.8019361E−11 |
| A9 | −3.3090450E−10 | −2.1922562E−10 | −8.6230795E−13 |
| A10 | 2.0957271E−11 | 5.1711944E−12 | −4.1756360E−14 |
| A11 | 7.5342315E−13 | 7.1159904E−13 | 7.3353204E−16 |
| A12 | −8.8615783E−14 | −2.8647683E−14 | 2.1617838E−17 |
| A13 | −7.7543057E−18 | −1.2065288E−15 | −3.6479887E−19 |
| A14 | 1.8537081E−16 | 6.9429403E−17 | −7.1038618E−21 |
| A15 | −3.2765477E−18 | 8.9656942E−19 | 1.0250609E−22 |
| A16 | −1.8149361E−19 | −8.4206778E−20 | 1.4984869E−24 |
| A17 | 5.7856799E−21 | −2.0537544E−23 | −1.5115242E−26 |
| A18 | 4.4838089E−23 | 4.7348794E−23 | −1.8863213E−28 |
| A19 | −3.2288826E−24 | −2.1717490E−25 | 9.1094159E−31 |
| A20 | 2.8460304E−26 | −8.4338153E−27 | 1.0790073E−32 |

Example 3

FIG. 3 shows a cross-sectional view of a lens configuration and an optical path of an imaging optical system of Example 3. The imaging optical system of Example 3 consists of, in order from a magnified side, negative lenses L1 to L5, positive lenses L6 to L9, a negative lens L10, a positive lens L11, a negative lens L12, a positive lens L13, a negative lens L14, positive lenses L15 and L16, negative lenses L17 and L18, and positive lenses L19 to L21. The lens L9 and the lens L10 are cemented together and constitute a third cemented lens CE3. The lens L12 and the lens L13 are cemented together and constitute a first cemented lens CE1. The lens L14 and lens L15 are cemented together and constitute a second cemented lens CE2. The lens L18 and the lens L19 are cemented together.

Figure 6:
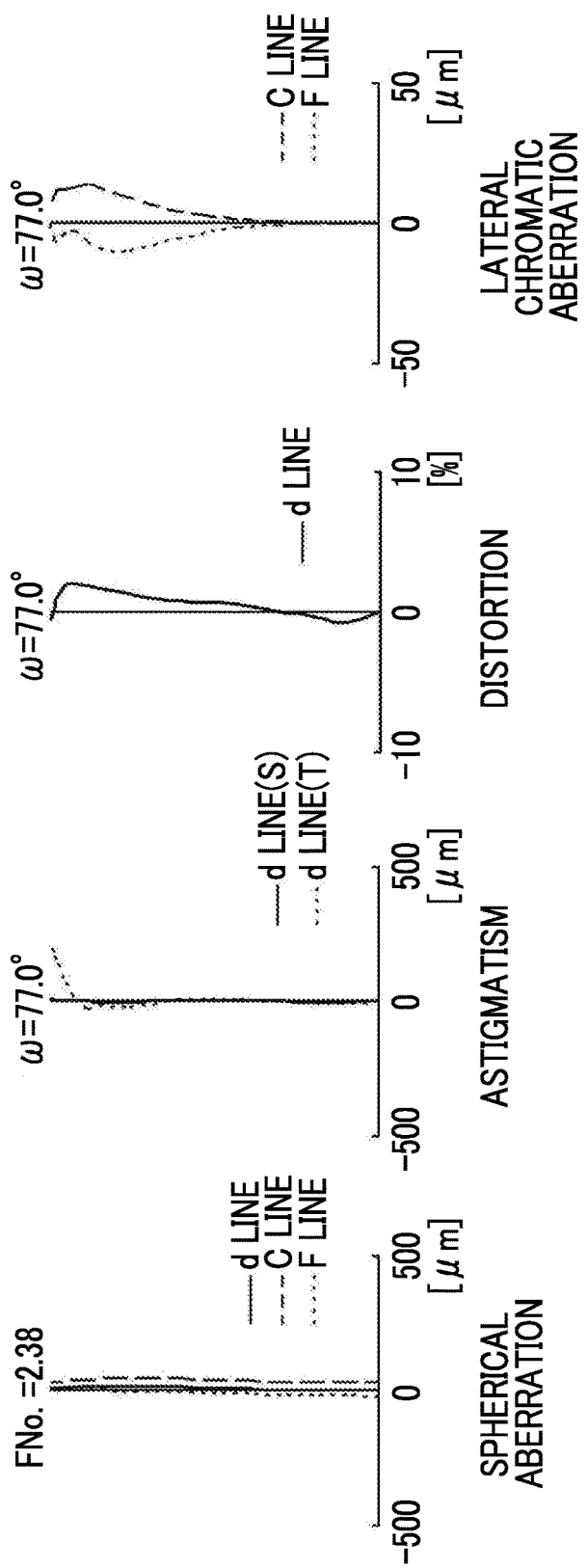
FIG. 6 is a diagram of aberrations of the imaging optical system of Example 3 of the present invention.

Table 7 shows basic lens data of the imaging optical system of Example 3, Table 8 shows specifications, Table 9 shows aspherical coefficients, and FIG. 6 shows a diagram of aberrations. The diagram shown in FIG. 6 corresponds to a case where a distance on the optical axis from a lens surface on the most magnified side to a magnified-side conjugate point is 0.4295 m.

TABLE 7

Example 3

| Si | Ri | Di | Ndj | ν dj |
|---|---|---|---|---|
| *1 | −36.1570 | 3.7758 | 1.53158 | 55.08 |
| *2 | −168.8428 | 8.9001 | | |
| 3 | 101.2512 | 1.4996 | 1.91082 | 35.25 |
| 4 | 32.9595 | 12.6041 | | |
| 5 | 51.2677 | 1.5003 | 1.95375 | 32.32 |
| 6 | 37.8029 | 12.5307 | | |
| *7 | −1277.1908 | 1.4991 | 2.00178 | 19.32 |
| 8 | 62.0810 | 17.9990 | | |
| *9 | −38.3130 | 2.4557 | 1.55032 | 75.50 |
| 10 | −460.9335 | 6.9993 | | |
| 11 | −261.7544 | 10.4226 | 1.90043 | 37.37 |
| 12 | −49.3992 | 17.9674 | | |
| 13 | 71.4261 | 24.2772 | 1.94595 | 17.98 |
| 14 | 151.9241 | 62.7160 | | |
| 15 | 91.8746 | 7.8167 | 1.59282 | 68.62 |
| 16 | −58.8269 | 0.1991 | | |
| 17 | 62.2270 | 13.5998 | 1.75500 | 52.32 |
| 18 | −33.6356 | 1.3642 | 1.92286 | 20.88 |
| 19 | 42.0185 | 10.0087 | | |
| *20 | −55.8291 | 7.6745 | 1.59282 | 68.62 |
| *21 | −32.5916 | 29.7935 | | |
| *22 | 81.3501 | 10.0205 | 1.59282 | 68.62 |
| 23 | 75.4128 | 22.2443 | 1.85478 | 24.80 |
| 24 | −472.0872 | 121.0253 | | |
| 25 | −382.7288 | 2.0992 | 1.94595 | 17.98 |
| 26 | 63.2991 | 25.4384 | 1.82165 | 24.04 |
| 27 | −90.2351 | 95.0922 | | |
| 28 | 44.9104 | 3.3741 | 1.55032 | 75.50 |
| 29 | −83.2807 | 4.2131 | | |
| 30 | 22.9578 | 1.9086 | 1.59282 | 68.62 |
| 31 | 16.3004 | 10.2355 | | |
| 32 | −18.4400 | 3.5852 | 1.84666 | 23.78 |
| 33 | 27.7579 | 6.5062 | 1.83481 | 42.72 |
| 34 | −27.5154 | 13.1871 | | |
| 35 | −1519.0872 | 2.5094 | 2.00178 | 19.32 |
| 36 | −65.8485 | 6.7082 | | |
| 37 | −109.2565 | 6.7829 | 1.94595 | 17.98 |
| 38 | −52.1787 | 13.1000 | | |
| 39 | ∞ | 32.3000 | 1.51633 | 64.14 |
| 40 | ∞ | | | |

TABLE 8

Example 3

| | |
|---|---|
| \|f\| | 3.32 |
| Bf | 34.99 |
| FNo. | 2.38 |
| 2 ω (°) | 154.2 |

TABLE 9

Example 3

| SURFACE NUMBER | 1 | 2 | 7 | 9 |
|---|---|---|---|---|
| KA | −1.3591752E+00 | −1.5877601E+02 | 1.3105542E+03 | 1.3957851E+00 |
| A3 | 5.6603425E−04 | 8.6892834E−04 | −1.5578650E−05 | −3.2858497E−05 |
| A4 | 1.4975709E−05 | −1.3828619E−04 | 6.3175234E−07 | 3.1667815E−06 |
| A5 | −1.3856927E−06 | 2.8704384E−05 | 8.4826264E−09 | −4.5405329E−08 |

TABLE 9-continued

Example 3

| | | | | |
|---|---|---|---|---|
| A6 | 1.8159594E−08 | −3.9237127E−06 | −9.5347636E−11 | −2.8681714E−09 |
| A7 | 7.2958194E−10 | 3.6668453E−07 | −1.8260166E−12 | 7.2906756E−11 |
| A8 | −1.8866025E−11 | −2.4468110E−08 | 2.4626139E−15 | 1.2663140E−12 |
| A9 | −2.3759668E−13 | 1.1877691E−09 | 1.8016357E−16 | −3.7592265E−14 |
| A10 | 1.0021352E−14 | −4.2243804E−11 | 6.0865773E−19 | −3.3716875E−16 |
| A11 | 4.1320237E−17 | 1.1000307E−12 | −9.5441156E−21 | 1.0004674E−17 |
| A12 | −3.1959863E−18 | −2.0773190E−14 | −6.8476519E−23 | 5.5019881E−20 |
| A13 | −7.6261560E−21 | 2.7772279E−16 | 2.8959588E−25 | −1.5240253E−21 |
| A14 | 7.4596275E−22 | −2.4916923E−18 | 3.2845803E−27 | −5.3289493E−24 |
| A15 | 1.9709806E−24 | 1.3191404E−20 | −5.0115545E−30 | 1.3405058E−25 |
| A16 | −1.3411695E−25 | −2.7294471E−23 | −8.3800775E−32 | 2.8389552E−28 |
| A17 | −2.3209150E−28 | 7.1718012E−27 | 4.5359690E−35 | −6.3393564E−30 |
| A18 | 1.4834036E−29 | −7.8462265E−28 | 1.1112267E−36 | −6.8069938E−33 |
| A19 | 2.7974048E−33 | −4.2551979E−31 | −1.6162501E−40 | 1.2488262E−34 |
| A20 | −6.4095388E−34 | 5.4641661E−32 | −6.0350145E−42 | 2.9901313E−38 |

| SURFACE NUMBER | 20 | 21 | 22 |
|---|---|---|---|
| KA | −2.7596123E−01 | 6.4859424E−01 | 1.0520323E+00 |
| A3 | −1.3366986E−04 | −1.5884896E−04 | 1.3354729E−04 |
| A4 | 6.5601698E−05 | 7.1608118E−05 | −1.8767328E−06 |
| A5 | −5.0548503E−06 | −3.5638044E−06 | −2.0944207E−07 |
| A6 | −2.1466984E−07 | −2.2249770E−07 | 2.5040061E−09 |
| A7 | 6.2620165E−08 | 3.7318347E−08 | 1.4754910E−10 |
| A8 | −1.7993811E−09 | 6.6531192E−11 | −2.1123621E−12 |
| A9 | −3.3090450E−10 | −2.1922562E−10 | −6.9749012E−14 |
| A10 | 2.0957271E−11 | 5.1711944E−12 | 1.0779943E−15 |
| A11 | 7.5342315E−13 | 7.1159904E−13 | 2.2551113E−17 |
| A12 | −8.8615783E−14 | −2.8647683E−14 | −3.2171181E−19 |
| A13 | −7.7543057E−18 | −1.2065288E−15 | −5.1297335E−21 |
| A14 | 1.8537081E−16 | 6.9429403E−17 | 5.3256430E−23 |
| A15 | −3.2765477E−18 | 8.9656942E−19 | 7.8392805E−25 |
| A16 | −1.8149361E−19 | −8.4206778E−20 | −4.2758792E−27 |
| A17 | 5.7856799E−21 | −2.0537544E−23 | −6.9941822E−29 |
| A18 | 4.4838089E−23 | 4.7348794E−23 | 8.6821785E−32 |
| A19 | −3.2288826E−24 | −2.1717490E−25 | 2.6759485E−33 |
| A20 | 2.8460304E−26 | −8.4338153E−27 | 4.6282237E−36 |

Table 10 shows values corresponding to Conditional Expressions (1) to (9) of the imaging optical systems of Examples 1 to 3. A value corresponding to Conditional Expression (3) of Example 2 relates to the third cemented lens CE3. In addition, the values shown in Table 10 are based on the d line.

TABLE 10

| EXPRESSION NUMBER | | EXAMPLE 1 | EXAMPLE 2 | EXAMPLE 3 |
|---|---|---|---|---|
| (1) | ν dn − ν dp | −5.48 | −5.48 | −6.06 |
| (2) | \|f\|/Rpr | −0.065 | −0.065 | −0.067 |
| (3) | \|f\|/R3cr | 0.078 | 0.083 | 0.079 |
| (4) | \|f\|/R2cr | −0.029 | −0.030 | −0.037 |
| (5) | d12/d2r | 1.501 | 1.578 | 1.273 |
| (6) | d2r/Ymax | 6.379 | 5.865 | 6.558 |
| (7) | \|Rnf\|/\|Rnr\| | 0.0059 | 0.0559 | 0.0831 |
| (8) | \|f\|/fA | 0.336 | 0.332 | 0.281 |
| (9) | \|f\|/fB | −0.036 | −0.037 | −0.029 |

As can be seen from the above-mentioned data, the imaging optical systems of Examples 1 to 3 is configured such that the total angle of view is equal to or greater than 154° to form a wide angle, the F-Number is less than 2.4 to have a small F-Number, and that high optical performance is realized by satisfactory correction of various aberrations including chromatic aberrations.

Figure 7:
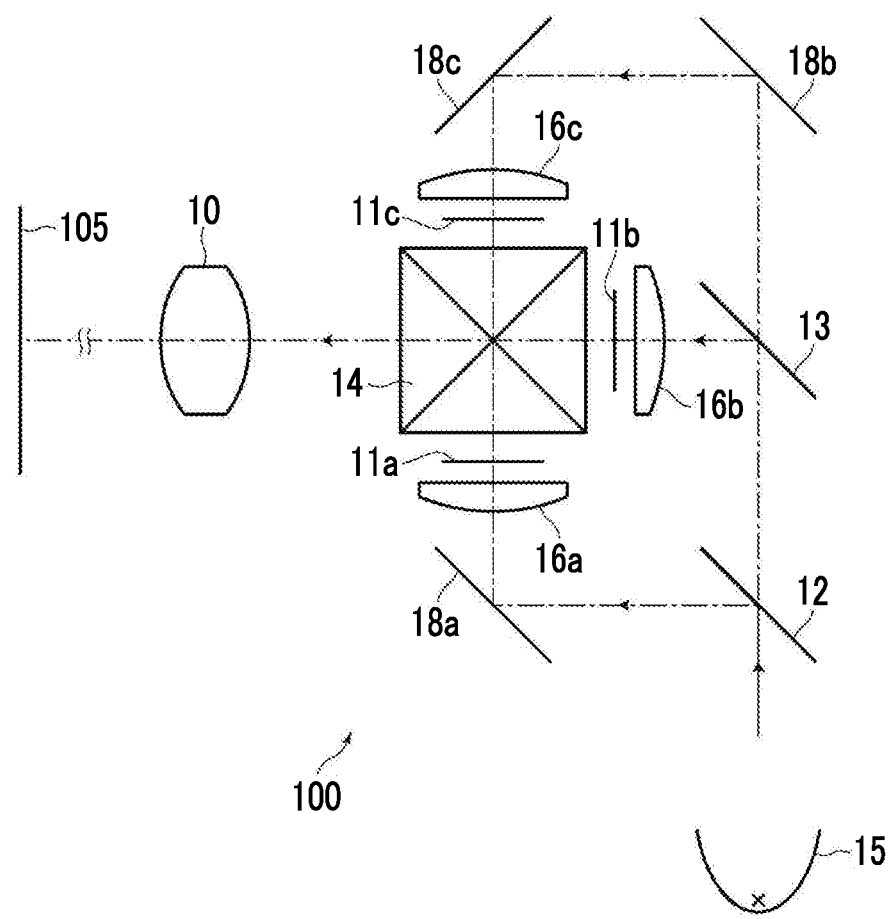
FIG. 7 is a schematic configuration diagram of a projection-type display apparatus according to an embodiment of the present invention.

Next, a projection-type display apparatus according to an embodiment of the present invention will be described. FIG. 7 is a schematic configuration diagram of a projection-type display apparatus according to the embodiment of the present invention. A projection-type display apparatus 100 shown in FIG. 7 includes an imaging optical system 10 according to an embodiment of the present invention, a light source 15, transmission-type display devices 11a to 11c as light valves corresponding to respective beams of colored light, dichroic mirrors 12 and 13 for color decomposition, a cross dichroic prism 14 for color synthesis, condenser lenses 16a to 16c, and total reflection mirrors 18a to 18c for deflecting an optical path. Meanwhile, in FIG. 7, the imaging optical system 10 is schematically shown. In addition, an integrator is disposed between the light source 15 and the dichroic mirror 12, but is not shown in FIG. 7.

White light from the light source 15 is decomposed into three colored light fluxes (G light, B light, and R light) by the dichroic mirrors 12 and 13. The decomposed light fluxes are then incident on the transmission-type display devices 11a to 11c corresponding to the respective colored light fluxes through the condenser lenses 16a to 16c, respectively, and are optically modulated. The modulated light fluxes are color-synthesized by the cross dichroic prism 14, and then are incident on the imaging optical system 10. The imaging optical system 10 projects an optical image of light optically modulated by the transmission-type display devices 11a to 11c onto a screen 105.

Figure 8:
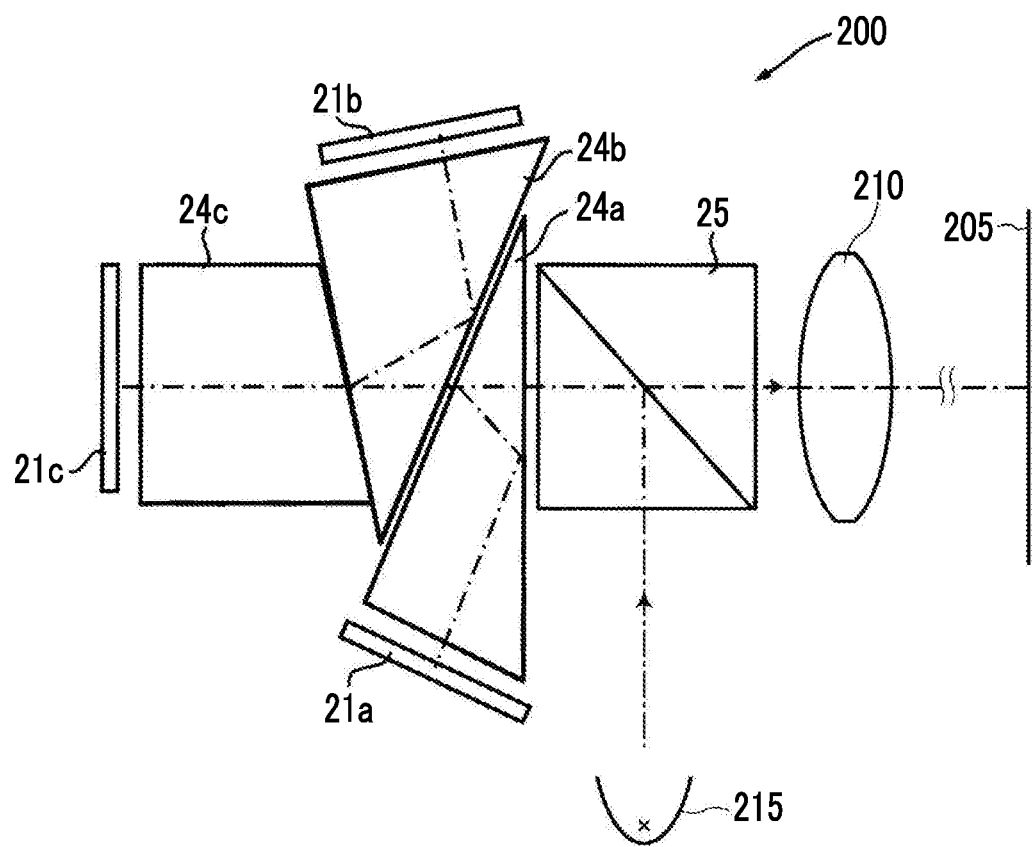
FIG. 8 is a schematic configuration diagram of a projection-type display apparatus according to another embodiment of the present invention.

FIG. 8 is a schematic configuration diagram of a projection-type display apparatus according to another embodiment of the present invention. A projection-type display apparatus 200 shown in FIG. 8 includes an imaging optical system 210 according to the embodiment of the present invention, a light source 215, DMDs 21a to 21c as light valves corresponding to respective beams of colored light, total internal reflection (TIR) prisms 24a to 24c for color decomposition and color synthesis, and a polarization separation prism 25 that separates illumination light and projected light. Meanwhile, in FIG. 8, the imaging optical system 210 is schematically shown. In addition, an integrator is disposed between the light source 215 and the polarization separation prism 25, but is not shown in FIG. 8.

White light from the light source 215 is reflected from a reflecting surface inside the polarization separation prism 25, and then is decomposed into three colored light fluxes (G light, B light, and R light) by the TIR prisms 24a to 24c. The respective colored light fluxes after the decomposition are incident on the DMDs 21a to 21c corresponding thereto and are optically modulated. The modulated light fluxes travel through the TIR prisms 24a to 24c again in an opposite direction and are color-synthesized. The synthesized light passes through the polarization separation prism 25 and is incident on the imaging optical system 210. The imaging optical system 210 projects an optical image of light optically modulated by the DMDs 21a to 21c onto a screen 205.

Figure 9:
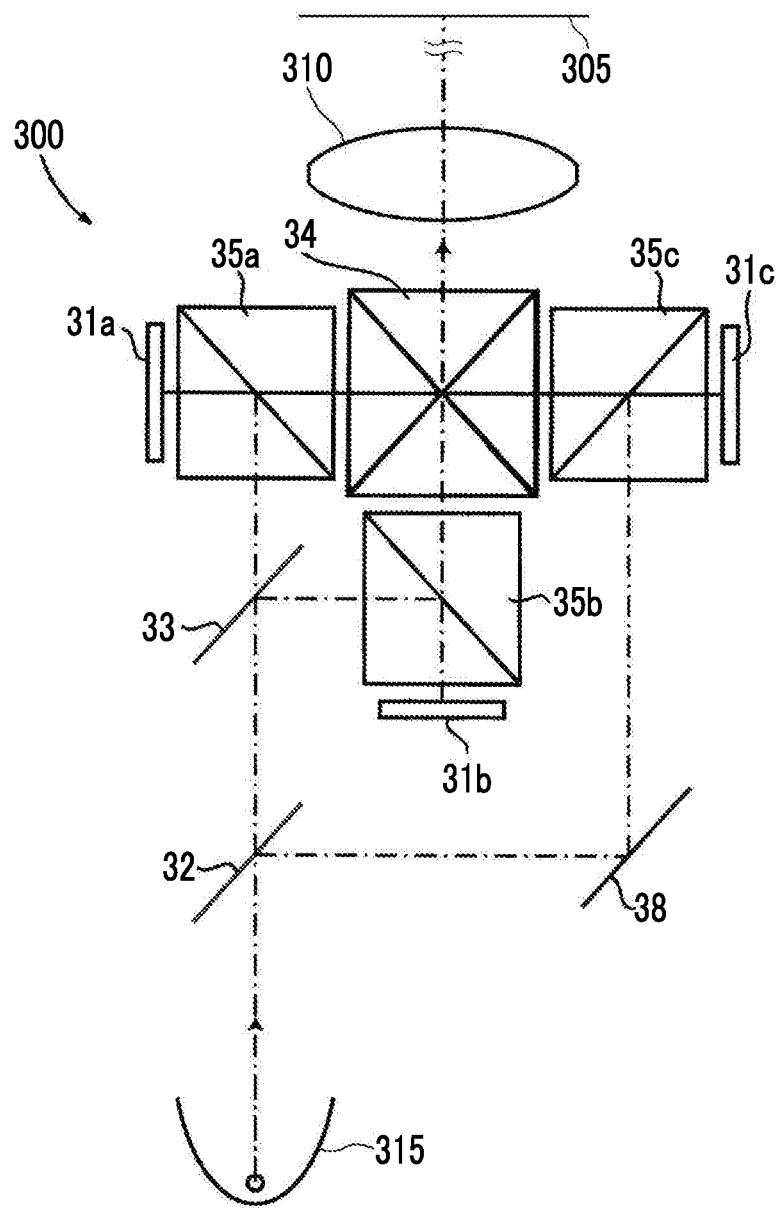
FIG. 9 is a schematic configuration diagram of a projection-type display apparatus according to still another embodiment of the present invention.

FIG. 9 is a schematic configuration diagram of a projection-type display apparatus according to still another embodiment of the present invention. A projection-type display apparatus 300 shown in FIG. 9 includes an imaging optical system 310 according to the embodiment of the present invention, a light source 315, reflection-type display devices 31a to 31c as light valves corresponding to respective beams of colored light, dichroic mirrors 32 and 33 for color separation, a cross dichroic prism 34 for color synthesis, a total reflection mirror 38 for optical path deflection, and polarization separation prisms 35a to 35c. Meanwhile, in FIG. 9, the imaging optical system 310 is schematically shown. In addition, an integrator is disposed between the light source 315 and the dichroic mirror 32, but is not shown in FIG. 9.

White light from light source 315 is decomposed into three colored light fluxes (G light, B light, and R light) by the dichroic mirrors 32 and 33. The respective colored light fluxes after the decomposition are incident on the reflection-type display devices 31a to 31c corresponding to the respective colored light fluxes through the polarization separation prisms 35a to 35c, respectively, and are optically modulated. The modulated light fluxes are color-synthesized by the cross dichroic prism 34, and then are incident on the imaging optical system 310. The imaging optical system 310 projects an optical image of light optically modulated by the reflection-type display devices 31a to 31c onto a screen 305.

Figure 10:
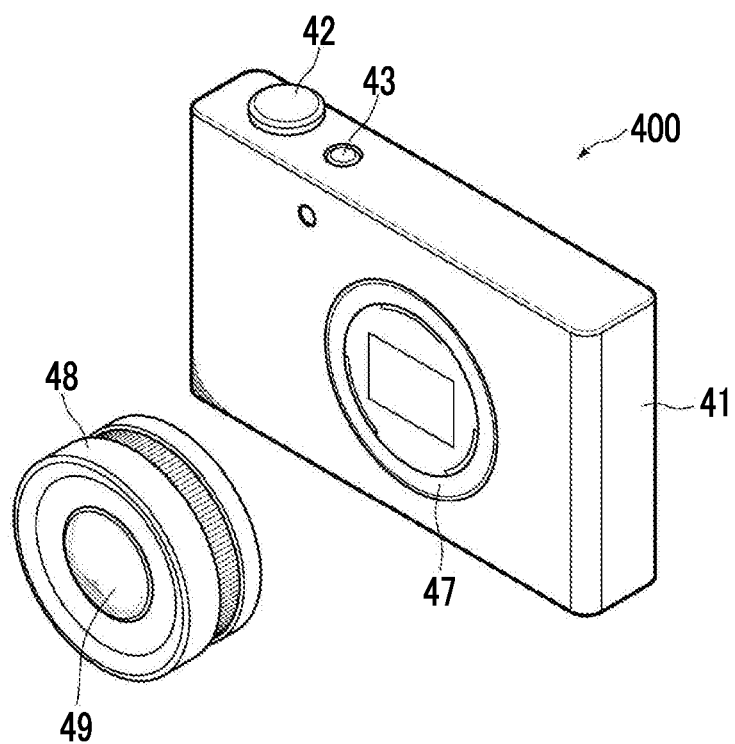
FIG. 10 is a perspective view of the front side of an imaging apparatus according to an embodiment of the present invention.
Figure 11:
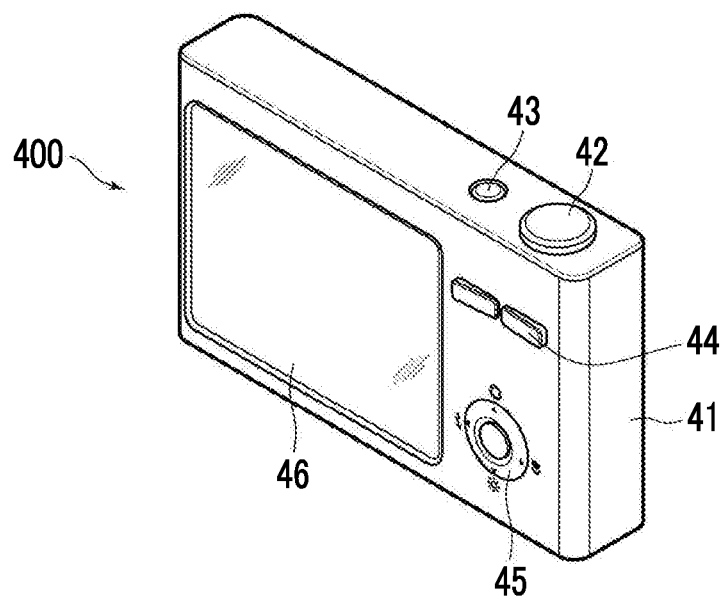
FIG. 11 is a perspective view of the rear surface side of the imaging apparatus shown in FIG. 10.

FIGS. 10 and 11 are appearance diagrams of a camera 400 which is an imaging apparatus of an embodiment of the present invention. FIG. 10 shows a perspective view when the camera 400 is seen from the front side, and FIG. 11 is a perspective view when the camera 400 seen from the rear surface side. The camera 400 is a single-lens digital camera, having no reflex finder, which has an interchangeable lens 48 detachably mounted therein. The interchangeable lens 48 has an imaging optical system 49 which is an optical system according to the embodiment of the present invention housed within a lens barrel.

This camera 400 includes a camera body 41, and is provided with a shutter button 42 and a power button 43 on the upper surface of the camera body 41. In addition, operating portions 44 and 45 and a display portion 46 are provided on the rear surface of the camera body 41. The display portion 46 is used for displaying a captured image or an image within an angle of view before image capture.

An imaging aperture on which light from an imaging target is incident is provided on the front central portion of the camera body 41, a mount 47 is provided at a position corresponding to the imaging aperture, and the interchangeable lens 48 is mounted onto the camera body 41 through the mount 47.

The camera body 41 is provided therein with an imaging device (not shown) such as a charge coupled device (CCD) that outputs an imaging signal according to a subject image formed by the interchangeable lens 48, a signal processing circuit that processes the imaging signal which is output from the imaging device to generate an image, a recording medium for recording the generated image, and the like. In this camera 400, a still image or a moving image can be captured by pressing the shutter button 42, and image data obtained by this image capture is recorded in the recording medium.

Hereinbefore, the present invention has been described through embodiments and examples, but the present invention is not limited to the above-described embodiments and examples, and can be variously modified. For example, the radius of curvature, the surface spacing, the refractive index, the Abbe number, the aspherical coefficient, and the like of each lens are not limited to the values shown in each of the numerical value examples, and other values can be used therefor.

In addition, the projection-type display apparatuses of the present invention are also not limited to the above configurations. For example, the light valves which are used and the optical members which are used for light flux separation or light flux synthesis are not limited to the above configurations, and can be modified in various forms.

In addition, the imaging apparatus of the present invention is also not limited to the above configuration, and can also be applied to, for example, a single-lens reflex camera, a film camera, a video camera, and the like.

What is claimed is:

1. An imaging optical system that conjugates both a reduced-side conjugate point and a magnified-side conjugate point with a position of an internal intermediate image, the system comprising:
    a negative lens group disposed on a most magnified side, and the negative lens group includes at least three and no more than six negative lenses;
    a positive lens disposed on a reduced side of the negative lens group continuously with the negative lens group;
    a first cemented lens which is a lens component closest to the intermediate image, and is formed by cementing one negative lens and one positive lens having a smaller Abbe number based on a d line than that of the negative lens together in order from a magnified side;
    a second cemented lens, disposed on a reduced side of the first cemented lens continuously with the first cemented lens, which has a positive refractive power as a whole; and
    at least one set of cemented lenses disposed between the positive lens, which is disposed on the reduced side of the negative lens group continuously with the negative lens group, and the first cemented lens.

2. The imaging optical system according to claim 1, wherein the second cemented lens includes one negative lens and one positive lens continuously in order from the most magnified side, and
    the following Conditional Expression (1) is satisfied, $$-9 < vdn - vdp < -2 \qquad (1)$$

where νdn is an Abbe number based on the d line of the negative lens of the second cemented lens, and
νdp is an Abbe number based on the d line of the positive lens of the second cemented lens.

3. The imaging optical system according to claim 2, wherein the following Conditional Expression (1-1) is satisfied, $$-8<\nu dn-\nu dp<-3 \tag{1-1}$$

4. The imaging optical system according to claim 1, wherein the following Conditional Expression (2) is satisfied, $$-0.08<|f|/Rpr<-0.03 \tag{2}$$

where f is a focal length of the imaging optical system, and
Rpr is a radius of curvature of a surface on the reduced side of the positive lens on the most magnified side.

5. The imaging optical system according to claim 4, wherein the following Conditional Expression (2-1) is satisfied, $$-0.07<|f|/Rpr<-0.04 \tag{2-1}$$

6. The imaging optical system according to claim 1, wherein the at least one set of cemented lenses disposed between the positive lens on the most magnified side and the first cemented lens satisfies the following Conditional Expression (3), $$0<|f|/R3cr<0.2 \tag{3}$$

where f is a focal length of the imaging optical system, and
R3cr is a radius of curvature of a surface on a most reduced side of a cemented lens disposed between the positive lens on the most magnified side and the first cemented lens.

7. The imaging optical system according to claim 6, wherein the following Conditional Expression (3-1) is satisfied $$0<|f|/R3cr<0.1 \tag{3-1}$$

8. The imaging optical system according to claim 1, wherein the following Conditional Expression (4) is satisfied, $$-0.05<|f|/R2cr<-0.01 \tag{4}$$

where f is a focal length of the imaging optical system, and
R2cr is a radius of curvature of a surface on a most reduced side of the second cemented lens.

9. The imaging optical system according to claim 8, wherein the following Conditional Expression (4-1) is satisfied $$-0.04<|f|/R2cr<-0.01 \tag{4-1}$$

10. The imaging optical system according to claim 1, further comprising a lens on the reduced side rather than the second cemented lens,
wherein the following Conditional Expression (5) is satisfied, $$0.9<d12/d2r<1.8 \tag{5}$$

where d12 is a distance on an optical axis between the first cemented lens and the second cemented lens, and
d2r is a distance on the optical axis between the second cemented lens and a lens disposed on the reduced side of the second cemented lens continuously with the second cemented lens.

11. The imaging optical system according to claim 10, wherein the following Conditional Expression (5-1) is satisfied $$1<d12/d2r<1.7 \tag{5-1}$$

12. The imaging optical system according to claim 1, further comprising a lens on the reduced side rather than the second cemented lens,
wherein the following Conditional Expression (6) is satisfied, $$3<d2r/Y\max<9 \tag{6}$$

where d2r is a distance on the optical axis between the second cemented lens and a lens disposed on the reduced side of the second cemented lens continuously with the second cemented lens, and
Ymax is a maximum image height on the reduced side.

13. The imaging optical system according to claim 1, wherein a lens surface of the first cemented lens on the most magnified side has an aspherical shape which is convex in a vicinity of the optical axis and decreases in positive refractive power toward a peripheral portion thereof.

14. The imaging optical system according to claim 1, wherein a surface on the magnified side of a negative lens on a most reduced side of the negative lens group is a concave surface.

15. The imaging optical system according to claim 14, wherein the following Conditional Expression (7) is satisfied, $$0<|Rnf|/|Rnr|<0.1 \tag{7}$$

where Rnf is a radius of curvature of the surface on the magnified side of the negative lens on the most reduced side of the negative lens group, and
Rnr is a radius of curvature of a surface on the reduced side of the negative lens on the most reduced side of the negative lens group.

16. The imaging optical system according to claim 1, wherein the following Conditional Expression (8) is satisfied, $$0.2<|f|/fA<0.5 \tag{8}$$

where f is a focal length of the imaging optical system, and
fA is a combined focal length from a lens on the most magnified side to the first cemented lens.

17. The imaging optical system according to claim 1, wherein the following Conditional Expression (9) is satisfied, $$-0.2<|f|/fB<0 \tag{9}$$

where f is a focal length of the imaging optical system, and
fB is a combined focal length from the second cemented lens to a lens on a most reduced side.

18. A projection-type display apparatus comprising:
a light source;
a light valve on which light from the light source is incident; and
the imaging optical system according to claim 1 as an imaging optical system that projects an optical image of light optically modulated by the light valve onto a screen.

19. An imaging apparatus comprising the imaging optical system according to claim 1.

* * * * *